US012005568B2

(12) United States Patent
Moriyama et al.

(10) Patent No.: US 12,005,568 B2
(45) Date of Patent: Jun. 11, 2024

(54) CONTROL DEVICE, CONTROL METHOD, AND PROGRAM

(71) Applicant: JOHNAN Corporation, Uji (JP)

(72) Inventors: Kozo Moriyama, Uji (JP); Shin Kameyama, Uji (JP); Truong Gia Vu, Uji (JP); Lucas Brooks, Uji (JP)

(73) Assignee: JOHNAN Corporation, Uji (JP)

( * ) Notice: Subject to any disclaimer, the term of this patent is extended or adjusted under 35 U.S.C. 154(b) by 241 days.

(21) Appl. No.: 17/613,958

(22) PCT Filed: Jul. 31, 2020

(86) PCT No.: PCT/JP2020/029464
§ 371 (c)(1),
(2) Date: Nov. 24, 2021

(87) PCT Pub. No.: WO2020/241905
PCT Pub. Date: Dec. 3, 2020

(65) Prior Publication Data
US 2022/0219331 A1    Jul. 14, 2022

(30) Foreign Application Priority Data
May 31, 2019    (JP) .................................. 2019-103199

(51) Int. Cl.
B25J 9/16       (2006.01)
B25J 13/00      (2006.01)
G06F 3/16       (2006.01)

(52) U.S. Cl.
CPC ............ B25J 13/006 (2013.01); G06F 3/167 (2013.01); *G05B 2219/39001* (2013.01)

(58) Field of Classification Search
CPC ...... B25J 13/006; B25J 19/066; B25J 9/1676; B25J 9/1694; G06F 3/167; G05B 2219/40202; G05B 2219/39001
See application file for complete search history.

(56) References Cited

U.S. PATENT DOCUMENTS 7,599,764 B2 * 10/2009 Matsuura ............ F02N 11/0807
                                                701/1
7,918,736 B2 *  4/2011 Walker ................... G07F 17/32
                                                463/40
(Continued)

FOREIGN PATENT DOCUMENTS

CN      108453728 A     8/2018
JP      2010-167523 A   8/2010
(Continued)

OTHER PUBLICATIONS

Asfour et al., ARMAR-6: A Collaborative Humanoid Robot for Industrial Environments, 2018, IEEE, p. 447-454 (Year: 2018).*

(Continued)

*Primary Examiner* — McDieunel Marc
(74) *Attorney, Agent, or Firm* — METROLEX IP LAW GROUP, PLLC

(57) ABSTRACT

A control device for controlling a robot that performs a task has an independent mode that causes the robot to work separately and a collaborative mode that causes the robot to work in collaboration with a worker. The control device causes the robot to operate in the independent mode or the collaborative mode. The control device is configured to determine whether a first predetermined condition is satisfied, based on a position of the worker, and to switch from the independent mode to the collaborative mode when the first predetermined condition is satisfied during the independent mode. The control device is configured to determine whether a second predetermined condition is satisfied, based on the position of the worker, and to switch from the collaborative mode to the independent mode when the second predetermined condition is satisfied during the collaborative mode.

3 Claims, 3 Drawing Sheets

(56) References Cited

U.S. PATENT DOCUMENTS

| | | | |
|---|---|---|---|
| 11,439,954 B2 * | 9/2022 | Katz | B01D 1/0058 |
| 2018/0093378 A1 | 4/2018 | Yamamoto et al. | |
| 2018/0099408 A1 | 4/2018 | Shibata | |
| 2018/0229366 A1 | 8/2018 | Abdallah et al. | |
| 2018/0354140 A1 | 12/2018 | Watanabe | |
| 2020/0156245 A1 | 5/2020 | Abdallah et al. | |

FOREIGN PATENT DOCUMENTS

| | | |
|---|---|---|
| JP | 2010-269418 A | 12/2010 |
| JP | 2011-125975 A | 6/2011 |
| JP | 2018-051734 A | 4/2018 |
| JP | 2018-062016 A | 4/2018 |
| JP | 2018-158393 A | 10/2018 |
| WO | 2017/098713 A1 | 6/2017 |

OTHER PUBLICATIONS

Jeong et al., Development of a direct teaching system for a cooperative cell-production robot considering safety and operability, 2009, IEEE, p. 5339-5344 (Year: 2009).*

Kang et al., Motion Recognition System for Worker Safety in Manufacturing Work Cell, 2018, IEEE, p. 1774-1776 (Year: 2018).*

Maurice et al., Ethical and Social Considerations for the Introduction of Human-Centered Technologies at Work, 2019, IEEE, 131-138 (Year: 2019).*

* cited by examiner

CONTROL DEVICE, CONTROL METHOD, AND PROGRAM

TECHNICAL FIELD

The present invention relates to a control device, a control method, and a program.

BACKGROUND ART

Conventional techniques have disclosed robot control devices for causing a robot to work with a worker (for example, see PTL 1).

A control device described in PTL 1 is configured to estimate actions of a worker from a result of an image captured by a camera, and to cause a robot to operate in accordance with the estimated actions of the worker. As an example, take a case of mounting a unit on an item under assembly. First, the robot transfers the unit to a mounting position, and the robot and the worker screw the unit on the item under assembly. Thereafter, the robot brings a cable to a predetermined position in the item under assembly, and the worker receives the cable and connects the cable to the unit.

When the robot transfers the unit to its mounting position but the worker is present in a work area or an operation area of the robot or the unit, the robot is slowed down or stopped. Similarly, when the robot transfers the cable to its predetermined position but the worker is present in the work area or the operation area of the robot, the robot is slowed down or stopped. This control device can thus prevent the robot and the unit from colliding with the worker.

CITATION LIST

Patent Literature

PTL 1: JP 2018-62016A

SUMMARY OF INVENTION

Technical Problem

The above-described conventional control device can cause the robot to work in collaboration with the worker, but does not assume that the worker and the robot perform their own tasks independently. Actually, in a situation where a worker and a robot perform their own tasks independently and sometimes work together, a control device has been requested to cause the robot to work not only separately but also in collaboration with the worker.

The present invention is made to achieve the above object, and aims to provide a control device, a control method, and a program that can serve in a situation where a worker and a robot perform their own tasks independently and sometimes work together, and that can cause the robot to work not only separately but also in collaboration with the worker.

Solution to Problem

A control device according to the present invention is a control device for controlling a robot that performs a task. The control device has an independent mode that causes the robot to work separately and a collaborative mode that causes the robot to work in collaboration with a worker. The control device includes an operation control section that causes the robot to operate in the independent mode or the collaborative mode, and a first switching section or a second switching section. The first switching section is configured to determine whether a first predetermined condition is satisfied, based on at least one of following points: a position of the worker, a posture of the worker, a motion of the worker, a direction of a line-of-sight of the worker, a sound made by the worker, and a workpiece supplied by the worker, and is configured to switch from the independent mode to the collaborative mode when the first predetermined condition is satisfied during the independent mode. The second switching section is configured to determine whether a second predetermined condition is satisfied, based on at least one of the following points: the position of the worker, the posture of the worker, the motion of the worker, the direction of the line-of-sight of the worker, the sound made by the worker, and the workpiece supplied by the worker, and is configured to switch from the collaborative mode to the independent mode when the second predetermined condition is satisfied during the collaborative mode.

According to this configuration, the operation mode can be set to the collaborative mode when the robot and the worker perform a collaborative task, and can be set to the independent mode when the robot performs a separate task without intervention of the worker. The control device can thus selectively cause the robot to perform the separate task and the collaborative task. When the worker needs to switch between operation modes, the worker can easily satisfy the first predetermined condition or the second predetermined condition to switch between the operation modes.

A control method according to the present invention is a control method for controlling a robot that performs a task. The control method includes: a step of causing the robot to work separately in an independent mode and to work in collaboration with a worker in a collaborative mode; and a step of determining whether a first predetermined condition is satisfied, based on at least one of following points: a position of the worker, a posture of the worker, a motion of the worker, a direction of a line-of-sight of the worker, a sound made by the worker, and a workpiece supplied by the worker, and switching from the independent mode to the collaborative mode when the first predetermined condition is satisfied during the independent mode, or a step of determining whether a second predetermined condition is satisfied, based on at least one of the following points: the position of the worker, the posture of the worker, the motion of the worker, the direction of the line-of-sight of the worker, the sound made by the worker, and the workpiece supplied by the worker, and switching from the collaborative mode to the independent mode when the second predetermined condition is satisfied during the collaborative mode.

A program according to the present invention causes a computer to implement: a procedure for causing a robot to work separately in an independent mode and to work in collaboration with a worker in a collaborative mode; and a procedure for determining whether a first predetermined condition is satisfied, based on at least one of following points: a position of the worker, a posture of the worker, a motion of the worker, a direction of a line-of-sight of the worker, a sound made by the worker, and a workpiece supplied by the worker, and switching from the independent mode to the collaborative mode when the first predetermined condition is satisfied during the independent mode, or a procedure for determining whether a second predetermined condition is satisfied, based on at least one of the following points: the position of the worker, the posture of the worker, the motion of the worker, the direction of the line-of-sight of the worker, the sound made by the worker, and the workpiece supplied by the worker, and switching from the collaborative mode to the independent mode when the second predetermined condition is satisfied during the collaborative mode.

Advantageous Effects of Invention

The control device, the control method, and the program according to the present invention can serve in a situation where a worker and a robot perform their own tasks independently and sometimes work together, and can cause the robot to work not only separately but also in collaboration with the worker.

DESCRIPTION OF EMBODIMENTS

An embodiment of the present invention is described below.

Figure 1:
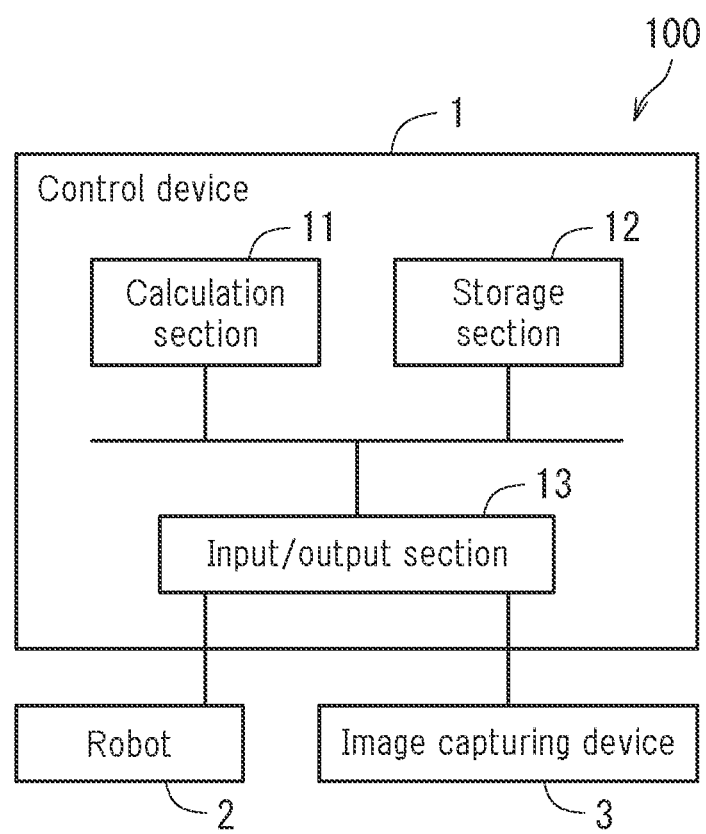
FIG. 1 is a block diagram showing a general configuration of a robot control system according to the present embodiment.

Referring to FIG. 1, a description is made of a configuration of a robot control system 100 that includes a control device 1 according to an embodiment of the present invention.

The robot control system 100 is applied to, for example, a factory floor in a cellular manufacturing system. As shown in FIG. 1, the robot control system 100 includes a control device 1, a robot 2, and an image capturing device 3. The robot control system 100 is configured to cause the robot 2 to perform a predetermined task on a production line.

The control device 1 is configured to control the robot 2, based on a result of an image captured by the image capturing device 3. The control device 1 has an independent mode and a collaborative mode, and is configured to cause the robot 2 to operate in the independent mode or the collaborative mode.

The independent mode causes the robot 2 to work separately. The collaborative mode causes the robot 2 to work in collaboration with a worker (a human). This means that the robot 2 performs a separate task during the independent mode, and performs a part of a collaborative task (a task for the robot 2 in the collaborative task) during the collaborative mode. In other words, the robot 2 is the only agent of the separate task during the independent mode, whereas both of the robot 2 and the worker are agents of the collaborative task during the collaborative mode. For example, a separate task is repeated during the independent mode, and a collaborative task is repeated during the collaborative mode. To give a specific example, the separate task is a task for the robot 2 to transfer a workpiece W1, which has been transported to a point P1, to a point P2. The collaborative task includes a task for the worker to process a workpiece W2 transported to a point P3, and a task for the robot 2 to transfer the processed workpiece W2 from the point P3 to a point P4. Note that a plurality of robots 2 and a plurality of workers may perform their tasks in a single working space.

The control device 1 is also configured to switch from the independent mode to the collaborative mode when a first predetermined condition is satisfied during the independent mode. The first predetermined condition is set in order to enable the control device 1 to determine whether the worker has requested a start of a collaborative task. For example, the control device 1 determines that the first predetermined condition is satisfied if the worker is present in a preset area (an area where the worker can perform his/her part of the collaborative task).

The control device 1 is also configured to switch from the collaborative mode to the independent mode when a second predetermined condition is satisfied during the collaborative mode. The second predetermined condition is set in order to enable the control device 1 to determine whether the worker has requested an end of the collaborative task. For example, the control device 1 determines that the second predetermined condition is satisfied if the worker has left the preset area.

The control device 1 includes a calculation section 11, a storage section 12, and an input/output section 13. The calculation section 11 is configured to control the control device 1 by performing arithmetic processing based on programs and the like stored in the storage section 12. The storage section 12 stores programs and the like. Examples of the programs include an operation program for the separate task of the robot 2, an operation program for the collaborative task of the robot 2, etc. The input/output section 13 is connected to the robot 2, the image capturing device 3, etc. Note that "the operation control section", "the first switching section", and "the second switching section" in the present invention are implemented when the calculation section 11 executes the programs stored in the storage section 12. Also note that the control device 1 is an example of "the computer" in the present invention.

The robot 2 has a multi-axis arm and a hand. The hand, as an end effector, is provided at an extreme end of the multi-axis arm. The robot 2 is configured to hold a workpiece by the hand and to transport the workpiece held by the hand.

The image capturing device 3 is configured to capture an image of a work area of the robot 2. The work area of the robot 2 is an area that surrounds the robot 2, covering a work area during the separate task and a work area during the collaborative task (hereinafter referred to as "separate work area" and "collaborative work area", respectively). For example, the separate work area covers an area in which the robot 2 moves and a workpiece held by the robot 2 passes during the separate task. The collaborative work area covers an area in which the robot 2 moves and a workpiece held by the robot 2 passes during the collaborative task. The image capturing device 3 is also equipped with a microphone (not shown) for collecting any sound around the robot 2. The result of an image captured by the image capturing device 3 and the result of a sound collected by the image capturing device 3 are entered into the control device 1.

—Operation for Switching Between Operation Modes—

Figure 2:
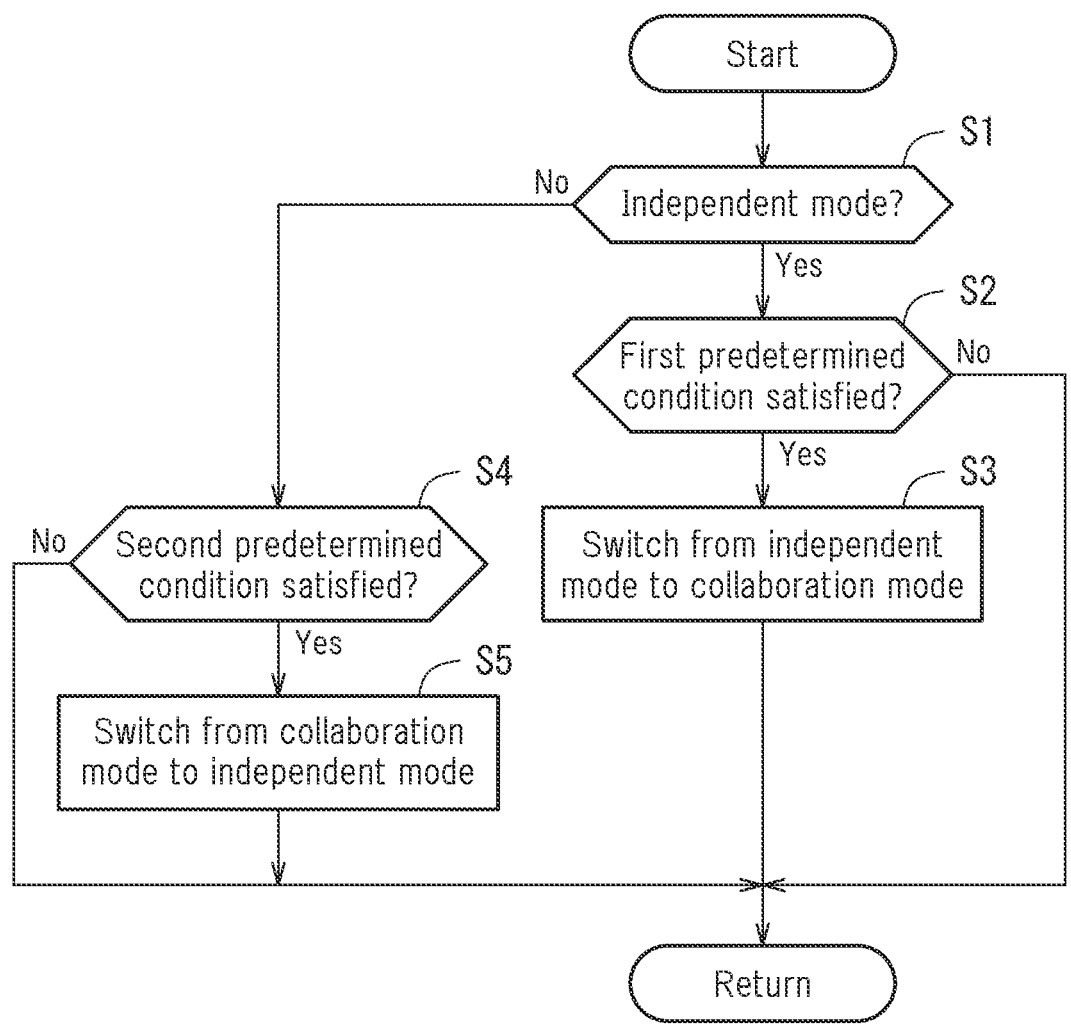
FIG. 2 is a flowchart describing an operation for switching operation modes in the robot control system according to the present embodiment.

Referring next to FIG. 2, a description is made of an operation for switching between operation modes in the robot control system 100 according to the present embodiment. This switching operation proceeds parallel to an operation during the independent mode or an operation during the collaborative mode to be described later. For example, the operation mode is set to the independent mode at the start of the operation of the robot control system 100. The following steps are performed by the control device 1.

In step S1 in FIG. 2, the control device 1 determines whether the operation mode is the independent mode. If the operation mode is determined to be the independent mode, the process goes to step S2. On the other hand, if the operation mode is determined to be not the independent mode (i.e., if the operation mode is the collaborative mode), the process goes to step S4.

In step S2, the control device 1 determines whether the first predetermined condition is satisfied. For example, when the control device 1 determines, based on the result of an image captured by the image capturing device 3, that a worker is present in the preset area, the first predetermined condition is determined to be satisfied. If the first predetermined condition is determined to be satisfied, the operation mode is switched from the independent mode to the collaborative mode in step S3, and the process goes to Return (go back to step S1). On the other hand, if the first predetermined condition is determined to be not satisfied, the operation mode is not switched from the independent mode, and the process goes to Return.

In step S4, the control device 1 determines whether the second predetermined condition is satisfied. For example, when the worker has left the preset area, the second predetermined condition is determined to be satisfied. If the second predetermined condition is determined to be satisfied, the operation mode is switched from the collaborative mode to the independent mode in step S5, and the process goes to Return. On the other hand, if the second predetermined condition is determined to be not satisfied, the operation mode is not switched from the collaborative mode, and the process goes to Return.

—Operation During the Independent Mode—

Figure 3:
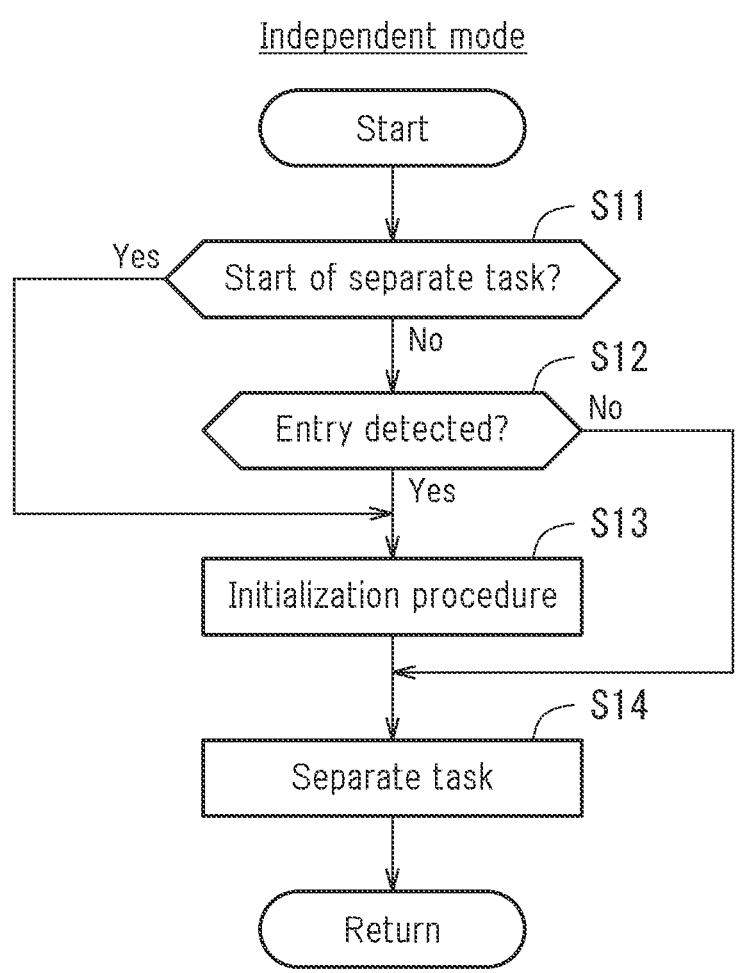
FIG. 3 is a flowchart describing an operation during an independent mode in the robot control system according to the present embodiment.

Referring next to FIG. 3, a description is made of an operation during the independent mode in the robot control system 100 according to the present embodiment. The following steps are performed by the control device 1.

In step S11 in FIG. 3, the control device 1 determines whether the current status is at the start of the separate task. If the current status is determined to be not at the start of the separate task (i.e. if the independent mode has been going on), the process goes to step S12. On the other hand, if the current status is determined to be at the start of the separate task (i.e., immediately after the robot control system 100 starts its operation, or immediately after the operation mode is switched from the collaborative mode to the independent mode), the process goes to step S13.

Next in step S12, the control device 1 determines, based on the result of an image captured by the image capturing device 3, whether a part of the worker's body has entered the separate work area of the robot 2. If the control device 1 determines that a part of the worker's body has entered the separate work area of the robot 2, the process goes to step S13, assuming that a certain action may have been done (e.g., the kind of workpiece may have been changed). On the other hand, if the control device 1 determines that a part of the worker's body has not entered the separate work area of the robot 2, an initialization procedure is unnecessary (because the robot 2 is performing the separate task to be repeated after the initialization procedure), and the process goes to step S14.

In step S13, the control device 1 conducts the initialization procedure. The initialization procedure includes, for example, distinction of the type of workpiece based on the result of an image captured by the image capturing device 3, selection of an operation program suitable for the type of workpiece, calculation of a workpiece position based on the result of an image captured by the image capturing device 3, and correction of the operation program based on the workpiece position. In other words, the type and position of the workpiece are recognized by image processing, and the operation program is selected and corrected in accordance with the result of the image processing.

In step S14, the control device 1 causes the robot 2 to perform a separate task, based on the corrected operation program.

During the separate task by the robot 2, when the control device 1 determines, based on the result of an image captured by the image capturing device 3, that the robot 2 may interfere with the worker, the control device 1 causes the robot 2 to avoid interference with the worker. Avoidance of interference means, for example, to divert the robot 2 away from the worker. Specifically, when the robot 2 or the workpiece held by the robot 2 is anticipated to collide with the worker, the control device 1 changes the paths of the robot 2 and the workpiece, thereby avoiding a collision and continuing the task simultaneously. For example, a collision is anticipated when a separation distance D from the robot 2 and the workpiece to the worker is less than a predetermined threshold Th. In this case, the control device 1 changes the paths of the robot 2 and the workpiece to keep the separation distance D at or above the predetermined threshold Th. The predetermined threshold Th is a preset value for determining whether the robot 2 and the workpiece are too close to the worker.

During the separate task by the robot 2, the separation distance D from the robot 2 and the workpiece to the worker is adjusted in accordance with the workpiece. Specifically, the separation distance D is adjusted by an adjustment of the predetermined threshold Th that is changed in accordance with the workpiece. For example, when the workpiece has a sharp shape, the predetermined threshold Th has a greater value than in a normal case and thereby increases the separation distance D.

After one separate task is completed, the process goes to Return (go back to step S11).

—Operation During the Collaborative Mode—

The description turns to an operation during the collaborative mode in the robot control system 100 according to the present embodiment.

The collaborative mode allows the robot 2 and the worker to work in collaboration with each other to perform a collaborative task. During the collaborative mode, the control device 1 causes the robot 2 to perform a part of the collaborative task, based on an operation program.

The control device 1 may conduct an emergency procedure when it determines that a worker has shouted during the collaborative task, based on the result of a sound collected by the image capturing device 3. The emergency procedure includes, for example, slowing down the moving speed of the robot 2, slowing down the moving speed of the robot 2 and then stopping the robot 2, stopping the robot 2 immediately, returning the robot 2 slowly to an initial position, and other like actions. The emergency procedure may be also triggered when a worker utters a prescribed word or phrase (e.g., "Danger!", "Stop!") or when an unusual sound (e.g., a sound of something dropped) is detected.

Also during the collaborative task, the control device 1 may be arranged to recognize a skill level of a worker based on the result of an image captured by the image capturing device 3, and to adjust the moving speed of the robot 2 in accordance with the skill level. Additionally, an alert may be issued when the skill level has changed drastically.

Also during the collaborative task, the control device 1 may be arranged to recognize a physical feature of a worker (e.g., dominant arm, arm length, etc.) based on the result of an image captured by the image capturing device 3, and to adjust the position (moving route) of the robot 2 in accordance with the physical feature. For example, the control device 1 may recognize the range of worker's operation and correct the moving route of the robot 2 so as not to interfere with this range.

Also during the collaborative task, when the worker touches the workpiece held by the robot 2, the control device 1 may reduce the holding power of the robot 2 so as to pass the workpiece to the worker.

For safety during the collaborative task, the control device 1 may be arranged to conduct an avoidance operation of causing the robot 2 to avoid the worker.

Advantageous Effects

As described above, the present embodiment includes the independent mode and the collaborative mode, switches from the independent mode to the collaborative mode when the first predetermined condition is satisfied, and can thereby selectively cause the robot 2 to perform the separate task and the collaborative task. This configuration enables the robot 2 to repeat the separate task, while performing the collaborative task in between the repetition of the separate task. As a result, in the situation where the worker and the robot 2 perform their own tasks independently and sometimes work together, the robot 2 is allowed to work not only separately but also in collaboration with the worker. As an example, the robot may perform the separate task for production of large-lot products, and may perform the collaborative task for production of small-lot products.

In the case where the robot control system 100 of the present embodiment is applied to the cellular manufacturing system, the robot 2 can perform both the separate task and the collaborative task in the same cell configuration, and can accomplish complex steps efficiently.

Specific examples can include following cases.

(A) In an assembly task, the robot 2 performs the separate task until a certain number of components (workpieces) are consumed completely. The collaborative task is performed when the components are consumed completely and the worker enters the preset area (for example, the work area of the robot 2) to supply new components.

(B) The robot 2 normally performs the separate task by picking up components placed at a predetermined position. The collaborative task is performed when a defective component is found and the worker enters the preset area (for example, the work area of the robot 2) to supply a replacement.

In the present embodiment, the first predetermined condition is determined to be satisfied when the worker is present in the preset area. Accordingly, when the worker intends to start the collaborative task, it is easily possible to satisfy the first predetermined condition and switch the operation mode to the collaborative mode.

In the present embodiment, the second predetermined condition is determined to be satisfied when the worker has left the preset area. Then, the operation mode is changed from the collaborative mode to the independent mode. Accordingly, when the worker intends to end the collaborative task, it is easily possible to satisfy the second predetermined condition and switch the operation mode to the independent mode.

During the independent mode, the present embodiment can avoid interference between the robot 2 and the worker, and can thereby ensure safety while the robot 2 is performing the separate task. This embodiment can also prevent a drop in productivity by causing the robot 2 to continue the separate task while avoiding its interference with the worker.

Also during the independent mode, the present embodiment conducts the initialization procedure when the worker enters the work area of the robot 2. This procedure enables an immediate adjustment, for example, when the type of workpiece is changed.

Also during the independent mode, the present embodiment adjusts the separation distance D in accordance with the workpiece. For a workpiece having a sharp shape, the separation distance D is increased to enhance safety.

As described above, the present embodiment can serve in the situation where the robot 2 and the worker perform their own tasks independently and sometimes work together in a common space, and can cause the robot 2 to work naturally with the worker while ensuring safety without sacrificing the productivity of the robot 2. Besides, the present embodiment can reduce a working space, in comparison with a case where the work area of the robot and the work area of the worker are divided from each other.

Other Embodiments

The embodiment disclosed herein is considered in all respects as illustrative and should not be any basis of restrictive interpretation. The scope of the present invention is therefore indicated by the appended claims rather than by the foregoing embodiment alone. The technical scope of the present invention is intended to embrace all variations and modifications falling within the equivalency range of the appended claims.

For example, the above embodiment mentions the example of causing the robot to transport a workpiece, but the embodiment is not limited to this example. Alternatively, the robot may process the workpiece or handle the workpiece otherwise. Further, the above embodiment mentions the example of the robot 2 equipped with the multi-axis arm and the hand, but the embodiment is not limited to this example. Alternatively, any robot structure is possible.

The above embodiment mentions the example of relying on the position of the worker when determining whether the first predetermined condition is satisfied, but the embodiment is not limited to this example. To determine whether the first predetermined condition is satisfied, an alternative embodiment may rely on at least one of following points: the position of the worker, the posture of the worker, the motion of the worker, the direction of the line-of-sight of the worker, the sound made by the worker, and the workpiece supplied by the worker. For example, the first predetermined condition may be determined to be satisfied when all of following items (1) to (7) are met or when at least one of the following items (1) to (7), selected as appropriate, is met.

(1) The worker is present in the preset area.
(2) The front part of the worker's chest faces the robot.
(3) The front part of the worker's head faces the robot.
(4) The worker has made a prescribed motion (gesture).
(5) The line-of-sight of the worker is directed to the robot.
(6) The worker has made a prescribed sound.
(7) The worker has supplied a prescribed workpiece to the robot (the worker has placed a prescribed workpiece at a start point of the collaborative task with the robot).

The above embodiment mentions the example of relying on the position of the worker when determining whether the second predetermined condition is satisfied, but the embodiment is not limited to this example. To determine whether the second predetermined condition is satisfied, an alternative embodiment may rely on at least one of the following points: the position of the worker, the posture of the worker, the motion of the worker, the direction of the line-of-sight of the worker, the sound made by the worker, and the workpiece supplied by the worker. Note that the points for the determination of the second predetermined condition are the same as those for the determination of the first predetermined condition, but, for example, details (parameters) of these points may be set differently. For example, the second predetermined condition may be determined to be satisfied when all of following items (8) to (14) are met or when at least one of the following items (8) to (14), selected as appropriate, is met.

(8) The worker has left the preset area.
(9) The front part of the worker's chest does not face the robot.
(10) The front part of the worker's head does not face the robot.
(11) The worker has made a prescribed motion.
(12) The line-of-sight of the worker is not directed to the robot.
(13) The worker has made a prescribed sound.
(14) The worker has supplied a prescribed workpiece to the robot (the worker has placed a prescribed workpiece at a start point of the separate task by the robot).

Further, the above embodiment mentions the example of avoiding interference between the robot 2 and the worker by causing the robot 2 to divert the worker, but the embodiment is not limited to this example. To avoid interference between the robot 2 and the worker, an alternative embodiment may reduce the moving speed of the robot or may temporarily stop the movement of the robot.

When the robot 2 continues the separate task while avoiding a collision with the worker, the above embodiment may be also arranged not to slow down and not to stop. In other words, the independent mode may allow the robot to perform the separate task while avoiding a collision with the worker, without slowing down and stopping the robot 2. In this context, "not to slow down the robot 2" and "not to stop the robot 2" may be, for example, to keep the moving speed of the robot 2 constant (the moving speed remains the same before and after a collision-avoiding action) or to increase the moving speed of the robot 2 such that diversion of the robot 2 does not cause any delay in the arrival time at its destination.

The above embodiment mentions the example of performing the separate task once in step S2, but the embodiment is not limited to this example. If the separate task is composed of a plurality of work units, the work units may be performed sequentially in step S2.

The above embodiment mentions the example of increasing the separation distance D when the workpiece has a sharp shape, but the embodiment is not limited to this example. Alternatively, the separation distance may be increased when the workpiece is at a high temperature or when the workpiece is unstable.

The above embodiment mentions the example of adjusting the separation distance D in accordance with the workpiece, but the embodiment is not limited to this example. Instead of the separation distance, the moving speed of the robot may be adjusted in accordance with the workpiece. For example, the moving speed of the robot may be reduced when the workpiece has a sharp shape, when the workpiece is at a high temperature, or when the workpiece is unstable.

The above embodiment mentions the example of conducting the initialization procedure when a part of the worker's body enters the separate work area of the robot 2, but the embodiment is not limited to this example. Alternatively, the initialization procedure may be conducted when a part of the worker's body enters a preset area within the separate work area of the robot.

INDUSTRIAL APPLICABILITY

The present invention is applicable to a control device, a control method, and a program for controlling a robot that performs a task.

REFERENCE SIGNS LIST 1 control device (computer)
2 robot
3 image capturing device
11 calculation section
12 storage section
13 input/output section
100 robot control system

The invention claimed is:

1. A control device for controlling a robot that performs a task,
the control device having an independent mode that causes the robot to work separately and a collaborative mode that causes the robot to work in collaboration with a worker,
the control device comprising a computer configured to perform operations comprising:
operation as an operation control section that causes the robot to operate in the independent mode or the collaborative mode; and
operation as a first switching section or a second switching section,
operation as the first switching section being configured to determine whether a first predetermined condition is satisfied, based on at least one of: a position of the worker, a posture of the worker, a motion of the worker, a direction of a line-of-sight of the worker, a sound made by the worker, and a workpiece supplied by the worker, and being configured to switch from the independent mode to the collaborative mode when the first predetermined condition is satisfied during the independent mode, and
operation as the second switching section being configured to determine whether a second predetermined condition is satisfied, based on at least one of: the position of the worker, the posture of the worker, the motion of the worker, the direction of the line-of-sight of the worker, the sound made by the worker, and the workpiece supplied by the worker, and being configured to switch from the collaborative mode to the independent mode when the second predetermined condition is satisfied during the collaborative mode.

2. A control method for controlling a robot that performs a task,
the control method comprising:
causing the robot to work separately in an independent mode and to work in collaboration with a worker in a collaborative mode; and
determining whether a first predetermined condition is satisfied, based on at least one of: a position of the worker, a posture of the worker, a motion of the worker, a direction of a line-of-sight of the worker, a sound made by the worker, and a workpiece supplied by the worker, and switching from the independent mode to the collaborative mode when the first predetermined condition is satisfied during the independent mode, or determining whether a second predetermined condition is satisfied, based on at least one of: the position of the worker, the posture of the worker, the motion of the worker, the direction of the line-of-sight of the worker, the sound made by the worker, and the workpiece supplied by the worker, and switching from the collaborative mode to the independent mode when the second predetermined condition is satisfied during the collaborative mode.

3. A non-transitory processor-readable storage medium storing a program for causing a computer to perform operations comprising:

causing a robot to work separately in an independent mode and to work in collaboration with a worker in a collaborative mode; and determining whether a first predetermined condition is satisfied, based on at least one of: a position of the worker, a posture of the worker, a motion of the worker, a direction of a line-of-sight of the worker, a sound made by the worker, and a workpiece supplied by the worker, and switching from the independent mode to the collaborative mode when the first predetermined condition is satisfied during the independent mode, or determining whether a second predetermined condition is satisfied, based on at least one of: the position of the worker, the posture of the worker, the motion of the worker, the direction of the line-of-sight of the worker, the sound made by the worker, and the workpiece supplied by the worker, and switching from the collaborative mode to the independent mode when the second predetermined condition is satisfied during the collaborative mode.

* * * * *